United States Patent
Van Der Huizen et al.

(10) Patent No.: US 10,202,494 B2
(45) Date of Patent: Feb. 12, 2019

(54) BLOCK COPOLYMERS HAVING AMINE OR PHOSPHINE FUNCTIONALIZED END BLOCKS

(71) Applicant: KRATON POLYMERS U.S. LLC, Houston, TX (US)

(72) Inventors: Adrie A. Van Der Huizen, Amsterdam (NL); Carl L. Willis, Houston, TX (US); Marianne Stol, Amsterdam (NL); Xavier D. Muyldermans, Mont St. Guibert (BE)

(73) Assignee: Kraton Polymers U.S. LLC, Houston, TX (US)

(*) Notice: Subject to any disclaimer, the term of this patent is extended or adjusted under 35 U.S.C. 154(b) by 181 days.

(21) Appl. No.: 15/293,981

(22) Filed: Oct. 14, 2016

(65) Prior Publication Data
US 2017/0107332 A1    Apr. 20, 2017

Related U.S. Application Data

(60) Provisional application No. 62/242,249, filed on Oct. 15, 2015.

(51) Int. Cl.
| | | |
|---|---|---|
| C08F 297/04 | (2006.01) | |
| C08G 81/02 | (2006.01) | |
| C08J 5/18 | (2006.01) | |

(52) U.S. Cl.
CPC .......... *C08G 81/022* (2013.01); *C08F 297/04* (2013.01); *C08J 5/18* (2013.01); *C08J 2353/00* (2013.01)

(58) Field of Classification Search
CPC ..... C08F 297/04; C08F 226/06; C08G 81/022
See application file for complete search history.

(56) References Cited

U.S. PATENT DOCUMENTS

| | | | |
|---|---|---|---|
| 4,514,304 A * | 4/1985 | Miyaki | B01D 61/44 210/500.34 |
| 9,061,254 B2 | 6/2015 | Willis | |
| 2008/0113244 A1 * | 5/2008 | Yamashita | C08F 8/24 429/480 |
| 2011/0159306 A1 | 6/2011 | Schellekens et al. | |
| 2014/0170428 A1 | 6/2014 | Schellekens et al. | |
| 2014/0197032 A1 | 7/2014 | Willis et al. | |

FOREIGN PATENT DOCUMENTS

GB    1544335    4/1979

OTHER PUBLICATIONS

Helfferich, F. Ion Exchange. Dover Publications, Inc. New York. 1995. ISBN 0-486-68784-8, p. 272.
Taiwan Search Report dated Apr. 27, 2017 for Application No. 105133350, filed Oct. 14, 2016.

* cited by examiner

*Primary Examiner* — Mark S Kaucher

(57) ABSTRACT

Disclosed herein is a functionalized block copolymer comprising (a) at least one end block D comprising on average at least one amino- or phosphino-functionalized polymer unit of formula (I)

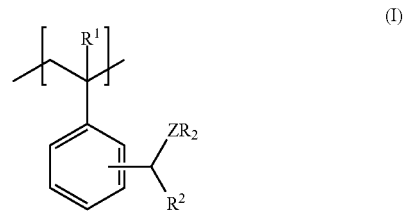

and
one or more additional blocks selected from the group consisting of (b) one or more A blocks substantially free of amino- or phosphino- functional groups and having a number average molecular weight of from about 1,000 to about 60,000, and has a high service temperature, and (c) one or more B blocks, wherein each block B is essentially non-functionalized, has a number average molecular weight of from about 1,000 to about 1,000,000, and has a glass transition temperature of at most about 20° C., and (d) mixtures of one or more A blocks and one or more B blocks; wherein Z is nitrogen or phosphorus; $R^1$ is hydrogen or alkyl; $R^2$ is hydrogen or is tertiary alkyl; R each independently, is alkyl or phenyl optionally substituted by a moiety $-(A^1-NR^a)_x R^b$ or $-(A^1-OR^a)_x R^b$; or two R groups, together with the Z to which they are bonded, form an optionally substituted ring; x is 1, 2 or 3; $A^1$ is straight chain alkylene optionally substituted by one or more methyl and/or ethyl groups; and $R^a$ and $R^b$, each independently, is hydrogen or alkyl; or a corresponding onium salt.

25 Claims, No Drawings

BLOCK COPOLYMERS HAVING AMINE OR PHOSPHINE FUNCTIONALIZED END BLOCKS

CROSS-REFERENCE TO RELATED APPLICATIONS

The present application is a non-provisional of and claims priority to U.S. Provisional Patent Application No. 62/242,249 filed Oct. 15, 2015 and entitled "Block Copolymers Having Amine or Phosphine Functionalized End Blocks," which application is incorporated by reference herein in its entirety.

FIELD

The present disclosure relates generally to chemistry and more particularly to amine or phosphine functionalized block copolymers.

BACKGROUND

Styrene block copolymers (SBCs) can be functionalized in order to further modify their characteristics. An example of this is the addition of sulfonic acid or sulfonate ester functional groups to the polymer backbone as described for example in U.S. Pat. Nos. 3,577,357, 5,468,574, 7,737,224 each of which is incorporated by reference herein. Additionally, co-pending application Ser. No. 13/181,306 to Willis et al., filed Jul. 12, 2011, describes modified sulfonated SBCs in which the sulfonic acid or sulfonate ester functional groups are converted to sulfonamide functional groups. Additionally, co-pending application 14/154,146, filed Jan. 13, 2014, discloses amine functionalized SBCs with the amine functionalized block in the interior of the block copolymer.

However, an ongoing need exists for functionalized SBCs having modified characteristics to meet one or more user and/or process goals.

SUMMARY

Disclosed herein is a functionalized block copolymer comprising (a) at least one end block D comprising on average at least one amino- or phosphino-functionalized polymer unit of formula (I)

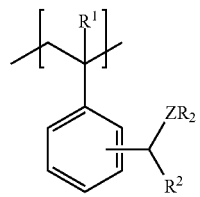

(I)

and
one or more additional blocks selected from the group consisting of: (b) one or more A blocks substantially free of amino- or phosphino-functional groups and having a number average molecular weight of from about 1,000 to about 60,000, and has a high service temperature, and (c) one or more B blocks, wherein each block B is essentially non-functionalized, has a number average molecular weight of from about 1,000 to about 1,000,000, and has a glass transition temperature of at most about 20° C., and (d) mixtures of one or more A blocks and one or more B blocks; wherein Z is nitrogen or phosphorus; $R^1$ is hydrogen or alkyl; $R^2$ is hydrogen or is tertiary alkyl; R each independently, is alkyl or phenyl optionally substituted by a moiety $-(A^1-NR^a)_xR^b$ or $-(A^1-OR^a)_xR^b$; or two R groups, together with the Z to which they are bonded, form an optionally substituted ring; x is 1, 2 or 3; $A^1$ is straight chain alkylene optionally substituted by one or more methyl and/or ethyl groups; and $R^a$ and $R^b$, each independently, is hydrogen or alkyl; or a corresponding onium salt.

Also disclosed herein is a process for preparing an amino- or phosphino-functionalized block copolymer comprising in an inert hydrocarbon solvent and in the presence of an initiator, (a) polymerizing an end block D from a plurality of p-vinylbenzylamine or vinylbenzylphosphine monomers, the p-vinylbenzylamine monomers or vinylbenzylphosphine monomers capable of being polymerized at a temperature range of from 20° C. to 60° C.; (b) polymerizing at least one or more additional blocks, wherein the one or more additional blocks are selected from the group comprising: an amorphous block B, the B block having a $T_g$ of at most 20° C., a crystalline or semi-crystalline block A, the block A having a high service temperature of at least about 20° C., and mixtures thereof; and (a) optionally coupling the block copolymer formed from steps (a)-(b), or polymerizing a second end block D.

DETAILED DESCRIPTION

The present disclosure may be understood more readily by reference to the following detailed description as well as to the examples included therein. In addition, numerous specific details are set forth in order to provide a thorough understanding of the aspects described herein. However, it will be understood by those of ordinary skill in the art that the aspects described herein can be practiced without these specific details. Also, the description is not to be considered as limiting the scope of the aspects described herein.

Unless specifically stated otherwise, all technical terms used herein have the meaning as commonly understood by those skilled in the art.

When referring to a block copolymer herein, or to a polymer thereof, it is understood by those having ordinary skill in the art that properties such as the molecular weight or the specific amount(s) of the polymer units which are present are not absolute values but rather may vary from polymer strand to polymer strand, or from one polymer A block to the corresponding polymer A block, within certain limits. Accordingly, properties such as the amount of a specific polymer unit in the block copolymer, or a particular block thereof, are referred to herein as the "average amount," or for molecular weight of the block copolymer or block, the "number average" is used unless otherwise designated. Additionally, for simplicity of discussion herein, the block copolymer itself may be referred to herein in the singular, but when referring to "average" it would be understood by those of skill in the art that in actual real world conditions, the block copolymer exists in a multitude of strands forming a polymer composition.

Unless specifically indicated otherwise, the expressions "substantially free of amino-functional groups" and "substantially free of phosphino-functional groups" as used herein with regard to polymer A blocks signifies that the respective polymer blocks comprise on average less than 1 polymer unit which carries a substituent comprising the moiety $-ZR_2$, or a corresponding onium salt. In particular, the respective polymer blocks comprise on average no measurable amounts of polymer units which carry a substituent comprising the moiety —$ZR_2$, or a corresponding onium salt.

Unless specifically indicated otherwise, the expression "functionalized" as used herein refers to block copolymers, and segments or blocks thereof, which comprise on average at least one polymer unit of formula (I) or a corresponding onium salt.

Unless specifically indicated otherwise, the expression "essentially non-functionalized" as used herein with regard to the polymer blocks B signifies that the respective polymer blocks comprise on average less than 1 polymer unit which carries a substituent comprising the moiety —$ZR_2$, or a corresponding onium salt. In particular, the respective polymer blocks comprise on average no measurable amounts of polymer units which carry a substituent comprising the moiety —$ZR_2$, or a corresponding onium salt.

Unless specifically indicated otherwise, the expression "onium salt" is used herein as a collective reference to ammonium or phosphonium salts of the functionalized block copolymer, a segment or block thereof, or a polymer unit thereof.

The expression "polymer unit" as used herein refers to the unit of a polymer chain which is formed by, and corresponds to, one monomer.

Unless specifically indicated otherwise, the expression "halogen" as used herein refers to a halogen, in particular fluorine, chlorine, bromine or iodine, more specifically chlorine or bromine.

Unless specifically indicated otherwise, the expression "service temperature" as used herein refers to the range of temperatures at which the material has useful mechanical properties. The upper limit of the service temperature range denotes the temperature above which the mechanical performance of the material is insufficient to meet minimum performance attributes of a particular application. For example, at temperatures above the upper limit of the service temperature range, the material may suffer deformation under applied stress which can be detrimental to the performance. Depending on the nature of the polymer, the upper limit of the service temperature range may correspond to the glass-transition temperature, $T_g$, (glassy polymer blocks) or the melting temperature, $T_m$, (crystalline or semi-crystalline polymer blocks).

The expression "high service temperature" as used herein refers to an upper limit of the service temperature range of equal to or greater than about 20° C.

Unless specifically stated otherwise, the expression "% wt." as used herein refers to the number of parts by weight of monomer per 100 parts by weight of polymer on a dry weight basis, or the number of parts by weight of ingredient per 100 parts by weight of specified composition.

As used herein, the term "molecular weights" refers to polystyrene equivalent, or apparent, molecular weight in g/mol of the polymer or block of the copolymer. The molecular weights referred to in this specification and claims can be measured with gel permeation chromatography (GPC) using polystyrene calibration standards, such as is done according to ASTM D5296. GPC is a method wherein polymers are separated according to molecular size, the largest molecule eluting first. The chromatograph is calibrated using commercially available polystyrene molecular weight standards. The molecular weight of polymers measured using GPC so calibrated are styrene equivalent molecular weights, also referred to as apparent molecular weights. The styrene equivalent molecular weight may be converted to true molecular weight when the styrene content of the polymer and the vinyl content of the diene segments are known. The detector used may be a combination ultraviolet and refractive index detector. The molecular weights expressed herein may be measured at the peak of the GPC trace and such are commonly referred to as "peak molecular weights."

Unless specifically stated otherwise, the expression "solution" as used herein refers to a liquid, uniformly dispersed mixture at the molecular or ionic level of one or more substances (the solute) in one or more liquid substances (the solvent).

All publications, patent applications, and patents mentioned herein are incorporated by reference in their entirety. In the event of conflict, the present specification, including definitions, is intended to control.

With respect to all ranges disclosed herein, such ranges are intended to include any combination of the mentioned upper and lower limits even if the particular combination is not specifically listed.

The present disclosure relates to block copolymers which are selectively functionalized in at least one external block by amino-, phosphino-, or corresponding onium salt groups, and which may exhibit anion exchange properties. More specifically, the selectively functionalized block copolymers include:
(a) at least one end block D comprising on average at least one amino- or phosphino-functionalized polymer unit of formula (I)

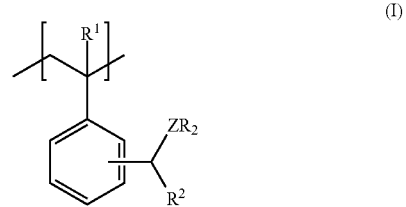

and
one or more additional blocks selected from the group consisting of:
(b) one or more A blocks substantially free of amino- or phosphino-functional groups and having a number average molecular weight of from about 1,000 g/mol to about 60,000 g/mol, and an upper limit of the service temperature range of equal to or greater than about 20° C., and
(c) one or more B blocks, wherein each block B is essentially non-functionalized, has a number average molecular weight of from about 1,000 g/mol to about 100,000 g/mol, and has a glass transition temperature of equal to or less than about 20° C.,
and
(d) mixtures of one or more A blocks and one or more B blocks;
wherein
Z is nitrogen or phosphorus;
$R^1$ is hydrogen or an alkyl group;
$R^2$ is hydrogen or is a tertiary alkyl group; and
R each independently, is a phenyl group or an alkyl optionally substituted by a moiety -$(A^1$-$NR^a)_x R^b$ or -$(A^1$-$OR^a)_x R^b$ where x is 1, 2 or 3;
$A^1$ is straight chain alkylene optionally substituted by one or more methyl and/or ethyl groups; and $R^a$ and $R^b$, each independently, is hydrogen or alkyl; or a corresponding onium salt.

; or two R groups, together with the Z to which they are bonded, form an optionally substituted ring;

Disclosed herein are block copolymers functionalized in at least one exterior block by amino- or phosphino- groups, or corresponding onium salt groups, and optionally additional hetero atoms, all of which contribute significant polarity to the block copolymer, and which can for example exhibit anion exchange properties or can be used for a variety of other applications.

In particular the block copolymer employed can have an end amino- or phosphino-functionalized D block and one or more "hard" A block or "soft" B block, which may be interior or exterior blocks. Some exemplary configurations of the block copolymer include without limitation D-A, D-A-D, D-A-D-A-D, $(D-A-D)_nX$, $(D-A)_nX$, D-A-B, D-B-A, D-A-B-D, D-B-A-D, D-B-A-B-D, D-A-B-A-D, $(D-B-A)_nX$, $(D-A-B)_nX$, D-B, D-B-D, D-B-D-B-D, $(D-B-D)_nX$, or $(D-B)_nX$, wherein X is the residue of a coupling agent and n is an integer from 2 to 30.

The block copolymers functionalized in the at least one block disclosed herein can be prepared by any suitable methodology. For example, a block can be polymerized and then functionalized with amines. In some instances, the block can be halogenated and then the halogen functionality substituted with an amine. Additionally, a monomeric pathway can be employed, wherein an exterior block is formed employing amino functionalized monomers. For example, one exemplary type of monomer can include vinylbenzylamino functionalities. The block copolymer can be formed for example via sequential polymerization and/or coupling reactions or other polymerization methods.

The monomeric pathway for formation of the functionalized block copolymer can provide improved control and precision over the formation of the copolymer. For example, greater control over the molecular weight of the functionalized block, as well as the amount of quaternization of the functionalized block can be controlled.

In some examples, each of the amino- or phosphino-functionalized blocks, or the amino- or phosphino-functionalized blocks in total, can be equal to or greater than about 20 wt %, or alternatively equal to or greater than about 30 wt %, alternatively equal to or greater than about 40 wt %, or alternatively equal to or greater than about 50 wt % of the block copolymer. Alternatively, the amino- or phosphino-functionalized block, or blocks in total, can be equal to or less than about 50 wt % of the block copolymer, alternatively equal to or less than about 40 wt % of the block copolymer, alternatively equal to or less than about 30 wt % of the block copolymer, or alternatively equal to or less than about 20 wt % of the block copolymer based on the total molecular weight of the block copolymer.

In some aspects, the amino- or phosphino-functionalized block can be a small portion relative the rest of the block copolymer. For example, the amino- or phosphino-functionalized block, or blocks, can form a "tail" and can be equal to or less than about 15 wt %, alternatively equal to or less than about 10 wt % of the block copolymer, alternatively equal to or less than about 7.5 wt % of the block copolymer, alternatively equal to or less than about 5 wt % of the block copolymer, alternatively equal to or less than about 3 wt % of the block copolymer, alternatively equal to or less than about 2 wt %, or alternatively equal to or less than about 1 wt % of the block copolymer, based on the total molecular weight of the block copolymer. Further, the block copolymer can be made up predominantly of a conjugated diene such as butadiene and/or isoprene. Furthermore, with the inclusion of a small amino- or phosphino-functionalized block "tail," the block copolymer, subsequent to quaternization, can be formed into a film or membrane which can have good mechanical properties.

In other aspects, the amino- or phosphino- functionalized block copolymer can be hydrogenated such that diene-containing polymer segments are hydrogenated. For example, amino- or phosphino-functionalized blocks can be included as a tail, and therefore hydrogenation levels of equal to or greater than about 50% alternatively equal to or greater than about 70% can be achieved.

The functionalized block copolymers of the present disclosure generally comprise at least one end D block and at least one of (i) an A block, (ii) a B block, or (iii) a mixture of A and B blocks, which may either be interior or exterior blocks. In some aspects, the functionalized block copolymer may further comprise one or more A block(s) and/or one or more interior B block(s). In some aspects, the functionalized block copolymer may further comprise at least one end D block combined with (i) one or more interior and/or exterior A block(s), wherein each A block may be the same or different and/or (ii) one or more interior and/or exterior B block(s), wherein each B block may be the same or different.

In an aspect, the interior and/or exterior A blocks of the functionalized block copolymer are substantially free of functional groups. Additionally, each of the individual A blocks has a number average molecular weight of from about 1,000 g/mol to 60,000 g/mol and has an upper limit of the service temperature range of at equal to or greater than about 20° C. e.

The nature and the composition of the monomers which make up the individual A blocks may be selected so as to provide for a polymer phase which meets the service temperature requirement and, thus, can be described as "glassy," "hard," "crystalline," or at least "semi-crystalline." These terms are used interchangeably throughout the specification. It will be understood that many "hard" polymeric blocks may not be fully crystalline and thus have varying degrees of crystallinity, i.e. semi-crystalline. This is distinguishable from amorphous blocks which have no or negligible amounts of crystallinity.

For glassy polymers, the upper limit of the service temperature range is typically limited by the temperature at which the polymer transitions from a glass-like behavior to a liquid-like behavior. This temperature is frequently referred to as glass-transition temperature, $T_g$. The $T_g$ of glassy end A blocks can be determined using differential scanning calorimetry (DSC) or dynamic mechanical analysis (DMA). For crystalline and semi-crystalline A blocks, the upper limit of the service temperature range is usually limited by the melting temperature, $T_m$, of the crystalline portion of the blocks. The melting temperature of crystalline or semi-crystalline A blocks can be determined using DSC.

In general, the high service temperature of the end A blocks is at least about 20° C. In some examples, the high service temperature of the end A blocks is at least about 50° C. In further examples, the high service temperature of the end A blocks is at least about 90° C.

In particular examples, each of the A blocks is independently selected from the group consisting of polymerized (i) ethylene monomers, (ii) propylene monomers, (iii) styrene and alpha-alkyl styrene monomers having a phenyl ring which is optionally substituted by one or more alkyl groups, (iv) (meth)acrylate ester monomers, conjugated diene monomers which are subsequently hydrogenated (v), and mixtures of monomers selected from (i) to (v).

When the A block is a polymer block of ethylene, it may be useful to polymerize ethylene via a Ziegler-Natta process, as taught in the references in the review article by G. W. Coates et al., Angew. Chem., Int. Ed., 41, 2236-2257 (2002). Such ethylene blocks can be prepared using anionic polymerization techniques as taught in U.S. Pat. No. 3,450,795. The block molecular weight for such ethylene blocks typically is between about 1,000 g/mol and about 60,000 g/mol.

When the A block is a polymer block of propylene, such polymer blocks may be prepared by a Ziegler-Natta process, as taught in the references in the review article by G. W. Coates et al., as cited above. The block molecular weight for such polypropylene blocks typically is between about 1,000 g/mol and about 60,000 g/mol.

When the A block is a polymer block of hydrogenated polydienes or conjugated dienes, such as hydrogenated polybutadiene, such polymer blocks may be prepared by any suitable methodology, for example as described in U.S. Pat. Nos. 3,670,054 and 4,107,236. The block molecular weight of such hydrogenated polydiene blocks typically is between about 1,000 g/mol and about 60,000 g/mol. The vinyl content of such A blocks, prior to hydrogenation, generally is equal to or less than about 20%, alternatively equal to or less than about 15%, or alternatively equal to or less than about 10%. The lower vinyl content along with hydrogenation results in a "harder" block thereby providing mechanical strength to a block copolymer incorporating the block.

The A blocks also may be polymer blocks of styrene or alpha-alkyl styrene monomers having a phenyl ring which is optionally substituted by one or more alkyl groups, such as optionally alkyl substituted styrene and alpha-methyl styrene, hereinafter collectively referred to as (methyl)styrene. The optional alkyl substituent of such (methyl)styrene monomers generally may have from 1 to 10 carbon atoms and may be straight chained or branched. Illustrative nonlimiting examples of such optionally alkyl substituted (methyl)styrene monomers include unsubstituted (methyl) styrene monomers, ortho-alkyl substituted (methyl) styrene monomers, para-alkyl substituted (methyl) styrene monomers, and ortho,para-dialkyl substituted (methyl)styrene monomers. Additional nonlimiting examples of optionally alkyl substituted (methyl)styrene monomers suitable for use in the present disclosure include unsubstituted (methyl) styrene, ortho-methyl (methyl) styrene, ortho-ethyl (methyl) styrene, ortho-n-propyl (methyl)styrene, ortho-iso-propyl (methyl) styrene, ortho-n-butyl (methyl) styrene, ortho-iso-butyl (methyl)styrene, ortho-sec-butyl (methyl)styrene, ortho-tert-butyl (methyl) styrene, ortho-decyl (methyl)styrene, isomers of ortho-dodecyl (methyl) styrene, para-methyl (methyl) styrene, para-ethyl (methyl) styrene, para-n-propyl (methyl) styrene, para-iso-propyl (methyl)styrene, para-n-butyl (methyl)styrene, para-iso-butyl (methyl)styrene, para-sec-butyl (methyl)styrene, para-tert-butyl (methyl)styrene, para-decyl (methyl)styrene, isomers of para-dodecyl (methyl)styrene, ortho,para-dimethyl (methyl) styrene, ortho,para-diethyl (methyl)styrene, ortho,para-di(n-propyl) (methyl)styrene, ortho,para-di(iso-propyl) (methyl) styrene, ortho,para-di(n-butyl) (methyl)styrene, ortho,para-di(iso-butyl) (methyl) styrene, ortho,para-di(sec-butyl) (methyl)styrene, ortho,para-di(tert-butyl) (methyl) styrene, ortho,para-didecyl (methyl)styrene, isomers of ortho,para-didodecyl (methyl)styrene, and mixtures of the above monomers. Additional (methyl)styrene monomers are the unsubstituted or mono $C_1$-$C_4$-alkyl substituted (methyl)styrene monomers.

In particular examples, such A blocks are polymer blocks of styrene monomers in which the phenyl ring is optionally alkyl substituted. Illustrative nonlimiting examples of such optionally alkyl substituted styrene monomers include in particular unsubstituted styrene monomers, ortho-alkyl substituted styrene monomers, para-alkyl substituted styrene monomers, and ortho,para-dialkyl substituted styrene monomers. Additional optionally alkyl substituted styrene monomers include unsubstituted styrene, ortho-methyl styrene, ortho-ethyl styrene, ortho-n-propyl styrene, ortho-iso-propyl styrene, ortho-n-butyl styrene, ortho-iso-butyl styrene, ortho-sec-butyl styrene, ortho-tert-butyl styrene, ortho-decyl styrene, isomers of ortho-dodecyl styrene, para-methyl styrene, para-ethyl styrene, para-n-propyl styrene, para-iso-propyl styrene, para-n-butyl styrene, para-iso-butyl styrene, para-sec-butyl styrene, para-tert-butyl styrene, para-decyl styrene, isomers of para-dodecyl styrene, ortho,para-dimethyl styrene, ortho,para-diethyl styrene, ortho,para-di(n-propyl) styrene, ortho,para-di(iso-propyl) styrene, ortho,para-di(n-butyl) styrene, ortho,para-di(iso-butyl) styrene, ortho,para-di(sec-butyl) styrene, ortho,para-di(tert-butyl) styrene, ortho,para-didecyl styrene, isomers of ortho,para-didodecyl styrene, and mixtures of the above monomers. Additional styrene monomers suitable for use in the present disclosure the unsubstituted or mono $C_1$-$C_4$-alkyl substituted styrene monomers.

When the A block is a polymer block of optionally substituted (alkyl)styrene, such polymer blocks also may be prepared by a Ziegler-Natta process, as taught in the references in the review article by G. W. Coates et al., as cited above. The block molecular weight for such (alkyl)styrene blocks typically is between about 1,000 g/mol and about 60,000 g/mol. In the polymerization processes used to make such (alkyl)styrene blocks, only one of the monomers, for example, styrene may be used, or two or more thereof may be used in combination. When two or more of the (alkyl) styrene monomers are used in combination, they may be copolymerized in any copolymerization form, e.g., randomly, in form of blocks and tapered blocks and the like. The copolymerization form may be affected by selecting conditions such as a combination of the monomers and the timing of adding the monomers to the polymerization system (for example, simultaneous addition of two or more monomers, or separate additions at intervals of a given time).

The A blocks may also be polymer blocks of acrylic esters or methacrylic esters, hereinafter collectively referred to as (meth)acrylic esters. Such polymer blocks may be made according to the methods disclosed for example in U.S. Pat. No. 6,767,976. Specific nonlimiting examples of suitable (meth)acrylic ester include esters of a primary alcohol and (meth)acrylic acid, such as methyl (meth)acrylate, ethyl (meth)acrylate, propyl (meth)acrylate, n-butyl (meth)acrylate, isobutyl (meth)acrylate, hexyl (meth)acrylate, 2-ethylhexyl (meth)acrylate, dodecyl (meth)acrylate, lauryl (meth) acrylate, methoxyethyl (meth)acrylate; esters of a secondary alcohol and (meth)acrylic acid, such as isopropyl (meth) acrylate, cyclohexyl (meth)acrylate and isobornyl (meth) acrylate; and esters of a tertiary alcohol and (meth)acrylic acid, such as tert-butyl (meth)acrylate. If necessary, as raw material or raw materials, one or more of other anionic polymerizable monomers may be used together with the (meth)acrylic ester in the present disclosure. Moreover, there may be used a multifunctional anionic polymerizable monomer having in the molecule thereof two or more methacrylic or acrylic structures, such as (meth)acrylic ester structures, for example, ethylene glycol di(meth)acrylate, 1,4-butanediol di(meth)acrylate, 1,6-hexanediol di(meth) acrylate, and trimethylolpropane tri(meth)acrylate.

In the polymerization processes used to make the (meth) acrylic ester polymer blocks, only one of the monomers, for example, the (meth)acrylic ester may be used, or two or more thereof may be used in combination. When two or more of the monomers are used in combination, any copolymerization form selected from random block, tapered block and the like is suitable. The copolymerization forms may be affected by selecting conditions such as a combination of the monomers and the timing of adding the monomers to the polymerization system (for example, simultaneous addition of two or more monomers, or separate additions at intervals of a given time).

In some aspects, each of the A blocks is a homo- or copolymer of (methyl)styrene and/or optionally a $C_1$-$C_4$-alkyl substituted (methyl)styrene. In further aspects, each of the A blocks is a homo- or copolymer of styrene and/or optionally a $C_1$-$C_4$-alkyl substituted styrene.

The individual A blocks of the functionalized block copolymer may be identical or different. When the A blocks of the functionalized block copolymer differ such differences may reside in the number average molecular weight of the individual blocks. Additionally or alternatively, such differences may reside in the nature or in the composition of the monomers which make up the individual A blocks. The individual A blocks can be similar, although not necessarily identical, in the nature and in the composition of the monomers which make up each of the individual A blocks.

In an aspect, the interior and/or exterior blocks B of the functionalized block copolymer also are substantially free of functional groups. Additionally, each of such blocks B may have a number average molecular weight of from about 1,000 g/mol to 1,000,000 g/mol, alternatively 1,000 g/mol to 600,000 g/mol, alternatively 1,000 g/mol to 500,000 g/mol and may have a glass transition temperature, $T_g$, of equal to or less than about 20° C. In some examples, the blocks B of the functionalized block copolymer have a glass transition temperature, $T_g$, of at equal to or less than about 10° C. In further examples, the optional interior blocks B of the functionalized block copolymer has a glass transition temperature, Tg, of equal to or less than about 0° C.

The nature and composition of the monomers which make up the individual blocks B may be selected such that the polymerized monomers provide a phase which meets the glass temperature requirement and, thus, can be described as "amorphous," "soft" or "rubbery." These terms are used interchangeably throughout the specification. It will be understood that "amorphous" blocks contain no or negligible amounts of crystallinity.

In an aspect, each block B is independently selected from the group consisting of polymerized (i) ethylene monomers, (ii) $C_3$-$C_8$ alpha-olefin monomers, (iii) isobutylene monomers, (iv) conjugated diene monomers, (v) (meth)acrylate ester monomers, (vi) a silicon polymer, and (vii) mixtures of monomers selected from (i) to (v), wherein segments containing polymerized conjugated diene monomers are optionally hydrogenated.

When the B blocks are polymer blocks of ethylene, it may be useful to polymerize ethylene via a Ziegler-Natta process, as taught in the references in the review article by G. W. Coates et al., as cited above. The ethylene blocks can be prepared using anionic polymerization techniques as described in U.S. Pat. No. 3,450,795. The block molecular weight for such ethylene blocks typically is between about 1,000 g/mol and about 1,000,000 g/mol.

When the B blocks are polymers of $C_3$-$C_8$ alpha-olefins or isobutylene, such polymer blocks also may be prepared by a Ziegler-Natta process, as described in the references in the review article by G. W. Coates et al., as cited above. The alpha-olefins can be propylene, butylene, hexene or octene, alternatively propylene. The block molecular weight for such alpha-olefin blocks typically is between about 1,000 g/mol and about 1,000,000 g/mol.

The B blocks may also be polymer blocks of conjugated dienes which are optionally hydrogenated. Suitable conjugated dienes include without limitation butadiene, isoprene, and the like, as well as 1,3-cyclodiene monomers, such as 1,3-cyclohexadiene, 1,3-cycloheptadiene and 1,3-cyclooctadiene. In an aspect, the B block is a polymer of 1,3-cyclohexadiene. In the event that the amino- or phosphino-functional group or other functionality is introduced after copolymerization of the various blocks more specifically addressed herein below the B blocks may be hydrogenated when using conjugated diene monomers because non-hydrogenated polymerized conjugated diene blocks are susceptible to halogenation. However, preparation of the functionalized block copolymer along a monomeric pathway as discussed herein avoids the need of preventative action, as the D block is formed from amino- or phosphino-functionalized monomers rather than a post polymerization reaction. Accordingly, non-halogenated precursor block copolymers which comprise one or more B block(s) made using conjugated diene monomers can be optionally hydrogenated prior to functionalization. When the B blocks are optionally hydrogenated polymer blocks of conjugated acyclic dienes such as butadiene or mixtures thereof, such blocks can have a vinyl content of from about 20 mol % to about 80 mol % prior to hydrogenation.

The B blocks may also be polymer blocks of (meth) acrylic esters. Such polymer blocks may be made according to the methods disclosed in U.S. Pat. No. 6,767,976. Specific examples of suitable (meth)acrylic ester include without limitation esters of a primary alcohol and (meth)acrylic acid, such as propyl (meth)acrylate, n-butyl (meth)acrylate, isobutyl (meth)acrylate, hexyl (meth)acrylate, 2-ethylhexyl (meth)acrylate, dodecyl (meth)acrylate, lauryl (meth)acrylate, methoxyethyl (meth)acrylate; esters of a secondary alcohol and (meth)acrylic acid, such as isopropyl (meth) acrylate, cyclohexyl (meth)acrylate and isobornyl (meth) acrylate; and esters of a tertiary alcohol and (meth)acrylic acid, such as tert-butyl (meth)acrylate. As raw material(s), one or more of other anionic polymerizable monomers may be used together with the (meth)acrylic ester in the present disclosure. Moreover, there may be used a multifunctional anionic polymerizable monomer having in the molecule thereof two or more methacrylic or acrylic structures, such as (meth)acrylic ester structures, for example, ethylene glycol di(meth)acrylate, 1,4-butanediol di(meth)acrylate, 1,6-hexanediol di(meth)acrylate, and trimethylolpropane tri (meth)acrylate.

Additionally, the B blocks may be polymer blocks of silicon rubber segments, i.e., blocks of organopolysiloxanes having recurring units of —[Si(R')$_2$—O]— wherein R' denotes an organic radical, e.g., alkyl, cycloalkyl or aryl.

The B blocks may also contain equal to or less than about 15 mol % of other anionically polymerizable monomers, such as monomers mentioned for the A blocks. In some examples, the B blocks may contain equal to or less than about 10 mol %, alternatively equal to or less than about 5 mol %, or alternatively equal to or less than about 2 mol % of the other monomers. However, in some examples, the B blocks will contain no other monomers.

In some of the particular examples, each of the blocks B is an optionally hydrogenated homo- or copolymer of butadiene and/or isoprene.

When multiple B blocks are present in the functionalized block copolymer such blocks may be identical or different. Differences between the individual B blocks may reside in the number average molecular weight or in the nature or the composition of the monomers which make up the individual B blocks. Where multiple B blocks are present, the individual B blocks can be similar, although not necessarily identical, in the nature and in the composition of the monomers which make up each of the individual B blocks.

The functionalized block copolymer of the present disclosure has at least one end block, D block, which has a number average molecular weight of from about 1,000 g/mol to about 100,000 g/mol and which comprises, on average, at least one amino- or phosphino-functionalized polymer unit of formula (I)

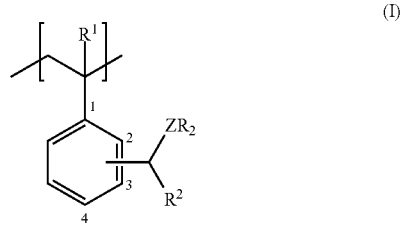

(I)

or a corresponding onium salt.

The moiety —$CHR_2$—$ZR_2$, or a corresponding onium salt moiety, may be bonded to the phenyl ring in formula (I) at any position. Accordingly, the moiety, —$CHR_2$—$ZR_2$, or a corresponding onium salt moiety, can be linked to the 2-position (ortho), 3-position (meta), or 4-position (para) of the phenyl ring in formula (I). With a view to ease of access to, and synthesis of, precursor block copolymers or monomers, the moiety can be linked to the 3- or 4-position. In the above formula (I), Z represents nitrogen or phosphorus.

$R^1$ in formula (I) represents hydrogen or an alkyl group. Alkyl groups in the position of $R^1$ may have from 1 to 6 carbon atoms and may be straight chained or branched. Illustrative alkyl groups for $R^1$ include without limitation methyl, ethyl, n-propyl, iso-propyl, n-butyl, iso-butyl, sec-butyl, tert-butyl and the like. In an aspect, R1 is hydrogen or methyl.

$R^2$ in formula (I) represents hydrogen or a tertiary alkyl group. Tertiary alkyl groups in the position of $R^2$ may have from 4 to 10 carbon atoms and, aside from the branching in the 1-position, may be straight chained or branched. Illustrative tertiary alkyl groups for $R^2$ include tert-butyl, 1,1-dimethyl-propyl, 1,1-dimethyl-butyl, 1,1,2-trimethyl-propyl, 1-ethyl,1-methyl-propyl, and the like. In an aspect, $R^2$ is hydrogen, or tert-butyl.

The groups represented by R in the moiety —$ZR_2$ in formula (I) may be identical or different and each R independently represents an alkyl group or phenyl group which in turn is optionally substituted by a moiety -$(A^1$-$NR^a)_x R^b$ or -$(A^1$-$OR^a)_x R^b$. Accordingly, one or both R may be hydrogen, or one R may be hydrogen whereas the other R is an optionally substituted alkyl group. Alternatively, one or both R groups may be identical or different unsubstituted alkyl or phenyl groups, or one R is an unsubstituted alkyl or phenyl group whereas the other R is a substituted alkyl or phenyl group. In alternative examples, both R represent identical or different substituted alkyl groups. In some aspects, at least one of the R groups is different from hydrogen. In further aspects, both of the groups R are different from hydrogen.

The alkyl or phenyl R groups may be substituted with aryl groups. Illustrative nonlimiting examples of the aryl substituted alkyl or phenyl R groups bonded to the nitrogen or phosphorus can include alkyl benzenes such as benzyl, ethyl, n-propyl, iso-propyl, n-butyl, iso-butyl, sec-butyl, tert-butyl, or pentyl benzene. The aryl groups may themselves be substituted with alkyl, alkenyl, or vinyl groups.

Unsubstituted alkyl groups in the position of R may have from 1 to 10 carbon atoms and may be straight chained or branched. Illustrative nonlimiting examples of unsubstituted alkyl groups for R include methyl, ethyl, n-propyl, iso-propyl, n-butyl, iso-butyl, sec-butyl, tert-butyl, and the isomers of pentyl, hexyl, heptyl, octyl, nonyl and decyl. In some of the particular instances at least one R of the moiety —$ZR_2$ in formula (I) is an unsubstituted $C_1$-$C_6$-alkyl group. In further aspects each R of the moiety —$ZR_2$ in formula (I), independently, is an unsubstituted $C_1$-$C_6$-alkyl group.

When R in the moiety —$ZR_2$ in formula (I) represents an alkyl or phenyl group which is substituted by a moiety -$(A^1$-$NR^a)_x R^b$ or -$(A^1$-$OR^a)_x R^b$, such R generally is straight chained, has from 2 to 4 carbon atoms, and optionally carries one or more additional methyl and/or ethyl groups. Illustrative nonlimiting examples of substituted alkyl groups, thus, include moieties such as substituted 1,2-ethylene, 1,2-propylene, 1,3-propylene, 1,2-butylene, 1,3-butylene, 2,3-butylene, 1,4-butylene, 2,3-pentylene, 2,4-pentylene, 2,4-pentylene, 3-methyl-2,4-pentylene, and the like. In some of the particular aspectsmples, such optionally substituted alkyl or phenyl group represented by R is 1,2-ethylene, 1,2-propylene, 1,3-propylene, or 1,4-butylene. The variable x of the substituent -$(A^1$-$NR^a)_x R^b$ or -$(A^1$-$OR^a)_x R^b$ represents an integer 1, 2 or 3, or alternatively 1 or 2.

$A^1$ of the substituent -$(A^1$-$NR^a)_x R^b$ or -$(A^1$-$OR^a)_x R^b$ represents a straight chained alkylene group which is optionally substituted by one or more methyl and/or ethyl groups. The straight chained alkylene groups represented by $A^1$ generally have from 2 to 4 carbon atoms. Illustrative optionally methyl- and/or ethyl-substituted alkylene groups as represented by $A^1$, thus, include moieties such as but not limited to substituted 1,2-ethylene, 1,2-propylene, 1,3-propylene, 1,2-butylene, 1,3-butylene, 2,3-butylene, 1,4-butylene, 2,3-pentylene, 2,4-pentylene, 2,4-pentylene, 3-methyl-2,4-pentylene, and the like. In some aspects, the optionally methyl- and/or ethyl-substituted alkylene group represented by $A^1$ is 1,2-ethylene, 1,2-propylene, 1,3-propylene, or 1,4-butylene.

The groups represented by $R^a$ and $R^b$ of the substituent -$(A^1$-$NR^a)_x R^b$ or -$(A^1$-$OR^a)_x R^b$ may be identical or different and each of $R^a$ and $R^b$, independently, represents hydrogen or an alkyl group. That is, if x has a value of 2 or 3, the groups represented by $R^a$ may be identical or different and each $R^a$, independently, represents hydrogen or an alkyl group. Alkyl groups in the position of $R^a$ and $R^b$ may have from 1 to 6 carbon atoms and may be straight chained or branched. Illustrative nonlimiting examples of alkyl groups for $R^a$ and $R^b$ include methyl, ethyl, n-propyl, iso-propyl, n-butyl, iso-butyl, sec-butyl, tert-butyl and the like. In some aspects, $R^a$ and $R^b$ represent hydrogen or $C_1$-$C_6$-alkyl. In further aspects, each of $R^a$ and $R^b$, independently, represents a $C_i$-$C_6$-alkyl group.

In further aspects the two R of the moiety —$ZR_2$ in formula (I), together with the Z to which they are bonded, form an optionally substituted ring which is made up of Z, carbon ring members, and optionally one or more additional heteroatom ring members selected from nitrogen and oxygen. The rings formed by Z and two R may have from 3 to 14 ring members, may be mono- or poly-cyclic, and may be saturated, partly unsaturated or aromatic. Optionally, such rings are substituted by one or more alkyl groups as hereinbefore mentioned in general and in particular for $R^a$. Illustrative nonlimiting examples of the rings formed by Z and two R include moieties such as pyrrolidine, piperidine, piperazine, 1-azabicyclo[2,2,2]nonane, 1,4-diazabicyclo[2,2,2]octane (DABCO), morpholine, pyrrole, pyrazole, imidazole, pyridine, pyridazine, pyrimidine, pyrazine, indole, isoindole, indazole, purine, carbazole, phenoxazine, azepine, the corresponding phosphorous containing rings, and the like. Those having ordinary skill will appreciate that the nitrogen in systems such as, e.g., DABCO and the like as mentioned in the foregoing, carries three substituents. More specifically, when $-ZR_2$ represents DABCO, the phenyl ring in formula (I) carries a group

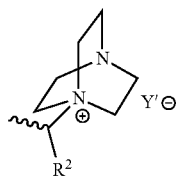

wherein ⁓ denotes the linkage to the phenyl ring and $Y^{r-}$ represents an anion equivalent. The respective polymer units of this type fall within the realm of the mentioned corresponding onium salts.

In an aspect, the D block has a polymer unit made up of polymerized para-vinylbenzylamino (p-vinylbenzylamino) derivatives or vinylbenzylphosphino (p-vinylbenzylphosphino) derivatives. Such block can be formed via a monomeric route using p-vinylbenzylamino derivative monomers or p-vinylbenzylphosphino monomers via sequential polymerization and/or coupling or other polymerization reactions. Therefore, referring to an amino-functionalized polymer unit of formula (I), R2 is hydrogen, and the amino moiety is linked to the 4-position. Accordingly, amino-functionalized polymer unit can have the p-benzylic structure of the following formula (IV):

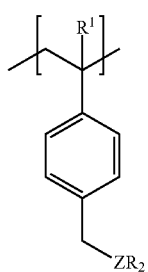

(IV)

wherein $-ZR_2$ is defined as described above.

Additionally, particular examples of amino group of the p-vinylbenzylamino (p-VBA) derivative includes at least the following:

| Amino moiety | Vinylbenzylamino derivative formed |
|---|---|
| | p-vinylbenzylpiperidine (p-VBP) |
| | p-vinylbenzylmorpholine (p-VBM) |
| | p-vinylbenzyldimethylamine (p-VBDMA) |
| | p-vinylbenzylpyrrolidine (p-VBPyr) |
| | p-vinylbenzyl-bis(2-methoxyethyl)amine (p-VBDEM) |
| | p-vinylbenzylpiperazine (p-VBMPip) |
| | p-dibenzylvinylbenzylamine (p-DBVBA) |

It is found herein that employment of p-vinylbenzylamino derivatives in the D block can have the beneficial effect of suppressing Hoffman elimination reactions. Hoffmann elimination, also known as exhaustive methylation, is a process where a quaternary amine is reacted to create a tertiary amine and an alkene.

Additionally, particular examples of phosphino group of the p-vinylbenzylphosphino (p-VBPh) derivative includes at least the following:

| Phosphino moiety | Vinylbenzylphosphino derivative formed |
|---|---|
| | 1-diphenylphosphinomethyl-4-vinylbenzene (VBMDPP) |
| | 1-bis(p-tolyl)phosphinomethyl-4-vinylbenzene (VBMBPT) |

In some aspects, the D block, in addition to the functionalized monomer can include (i) segments derived from homo- and copolymers of styrene, (ii) segments derived from homo- and copolymers of styrene having a phenyl ring which is substituted by a primary alkyl group, (iii) segments derived from homo- and copolymer of alpha-alkyl styrene, (iv) segments derived from homo- and copolymers of alpha-alkyl styrene having a phenyl ring which is substituted by a primary alkyl group, or (v) combinations of (i) to (iv).

In some aspects, segments of the D block in addition to polymer units of formula (I) or the corresponding onium salt can have segments of polymer units which may be in the A block as defined again, for example polymerized (i) ethylene monomers; (ii) propylene monomers, (iii) styrene and alpha-alkyl styrene monomers having a phenyl ring which is optionally substituted by one or more alkyl groups, (iv) (meth)acrylate ester monomers, or (v) mixtures of monomers selected from (i) to (iv). Accordingly, the polymer units of formula (I) or the corresponding onium salt can be random, tapered, or distributed in controlled fashion other polymer segments.

In particular aspects, aside from the polymer units of formula (I) or the corresponding onium salt, the D block can include segments derived from (alkyl)styrene or (alkyl) styrene wherein the phenyl ring is substituted by a primary alkyl group, i.e., —CH$_2$—R$^2$. Accordingly, each D block can include units selected from (i) segments derived from homo- and copolymers of styrene, (ii) segments derived from homo- and copolymers of styrene having a phenyl ring which is substituted by a primary alkyl group, (iii) segments derived from homo- and copolymer of alpha-alkyl styrene, (iv) segments derived from homo- and copolymers of alpha-alkyl styrene having a phenyl ring which is substituted by a primary alkyl group, or (v) combinations of (i) to (iv).

In some aspects, the co-monomers which may be copolymerized with the aforementioned (alkyl)styrene units of the D block(s) are not particularly restricted. Essentially all of the monomers mentioned in the context of the A blocks and B blocks are suitable for incorporation with the D blocks. When two or more of the monomers are used in combination, any copolymerization form selected from random, block, tapered block, controlled distribution block, and the like copolymerization forms may be utilized. For example, the D blocks may include segments of conjugated diene blocks having a controlled distribution of the co-monomers, and partially, selectively, or fully hydrogenated counterparts thereof, such as disclosed in U.S. Pat. No. 7,169,848.

Accordingly, in some aspects, the D block can be a mixed block of polymer units of formula (I) or the corresponding onium salt along with polymer units of styrene and or alpha-alkyl styrene (or other polymer unit). Accordingly, as will be further described herein, this permits a further control of the degree of functionalized polymer units within the D block. Thus, within the D block there would be styrene monomers which are not functionalized, and those which are functionalized with the amino- or phosphino-groups as described above.

Accordingly, in some aspects, the amino- or phosphino-group can be quaternized to form a corresponding onium salt of the functionalized polymer unit, more generally, can be represented by formula (I$^i$)

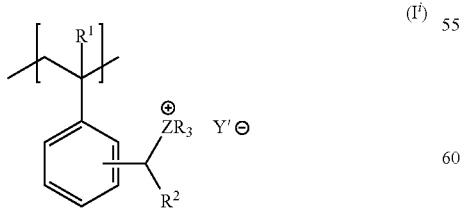

wherein R$^1$, R$^2$, R and Y$^{'-}$ have the aforementioned meaning. In other aspects, where the group(s) R represent alkyl or phenyl which is substituted by a moiety -(A$^1$-NR$^a$)$_x$R$^b$, one or more of the nitrogens of the -(A$^1$-NR$^a$)$_x$R$^b$ substituent(s) may by quaternized to form a corresponding onium salt of the functionalized polymer unit. Similarly, when the groups R, together with the Z atom to which they are bonded, form a heterocyclic ring system containing nitrogen ring members in addition to Z, such additional nitrogen ring members may be quaternized. For example, when —ZR$_2$ represents an optionally substituted piperazine ring, the corresponding onium salt may have a structure as represented by either one of formulae (I$^{ii}$) to (I$^{iv}$):

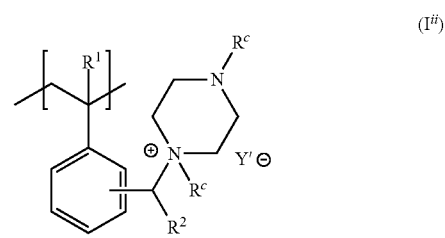

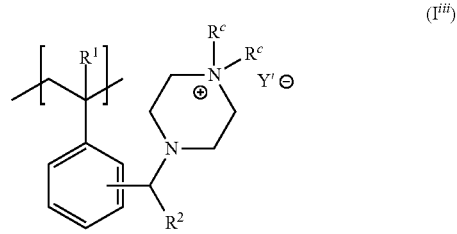

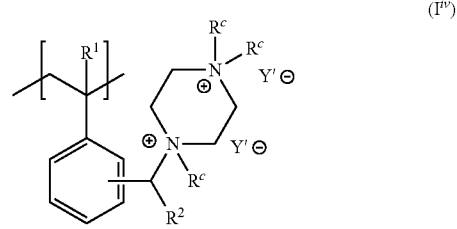

wherein Y$_{1-}$ has the aforementioned meaning and each R$^c$ independently is hydrogen or an alkyl group as in general and in particular mentioned for R$^a$. Similarly, when the groups R, together with the Z atom to which they are bonded, form the DABCO ring system, the substituent of the phenyl ring in formula (I) of the corresponding onium salts, also, may have one of the following structures:

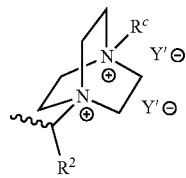

Moreover, in cases where the amine includes alkyl, or form ring systems which include mixed oxygen and nitrogen members, one or more of the nitrogen groups can be quaternized.

Accordingly, the corresponding onium salts of the functionalized polymer units may be represented generically by formula (I.1)

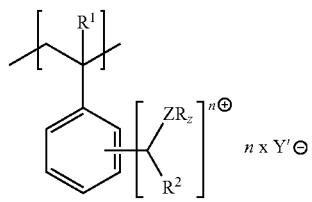

(I.1)

wherein the index z is 2 or 3, n is the total number of quaternized nitrogen or phosphorus atoms which are present in the —$ZR_2$ or —$ZR_3^+$ sub-structure, and $Y'^-$ has the aforementioned meaning. It is apparent from the foregoing that the number of functional groups which are present in the D block is determined by the average amount of functionalized polymer units, corresponding to formula (I), multiplied by the total number of nitrogen atoms present in the —$ZR_2$ or —$ZR_3^+$ sub-structure. When the functionalized block copolymer is in form of an onium salt equal to or greater than about 5%, alternatively equal to or greater than about 10% alternatively equal to or greater than about 15%, or alternatively equal to or less than about 100%, of the functional groups are in form of the onium salt.

The anion which provides the anion equivalent $Y'^-$ of the onium salt is not specifically restricted. In general, the anion may be any mono-basic or poly-basic anion of an inorganic acid or organic acid. Illustrative nonlimiting examples of anions include, for example, halogenides, in particular chloride, bromide and iodide, hydroxyl ($OH^-$), sulfate ($SO_4^{2-}$), hydrogen sulfate ($H_2O_4^-$), nitrate ($NO_3^-$), phosphate ($PO_4^{3-}$), hydrogen phosphate ($HPO_4^{2-}$), dihydrogen phosphate ($H_2PO_4^-$), carbonate ($CO_3^{2-}$), bicarbonate ($HCO_3^-$), borate ($H_4BO_4^-$), and the like; organic sulfonates such as mesylate ($CH_3$—$SO_3^-$), triflate ($CF_3$—$SO_3^-$), tosylate (4-$CH_3$—$C_6H_4$—$SO_3^-$), besylate ($C_6H_5$—$SO_3^-$), and the like; organic carboxylates such as acetate ($CH_3$—$CO_2^-$), chloroacetate ($CH_2Cl$—$CO_2^-$), dichloroacetate ($CHCl_2$—$CO_2^-$), trifluoroacetate ($CF_3$—$CO_2^-$), oxalate (($CO_2)_2^{2-}$), propionate ($C_2H_5$—$CO_2^-$), malonate (($CH_2CO_2)_2^{2-}$), butyrate ($C_3H_7$—$CO_2^-$), succinate ([$CH_2(CH_2CO_2)_2$]$^{2-}$), benzoate ($C_6H_5$—$CO_2^-$), phthalates ($C_6H_4(CO_2)_2^{2-}$), bis(trimethylsilyl)imide ([($CH_3)_3Si]_2N^-$), bis(trifluoromethyl-sulfonyl)imide ([$CF_3SO_2]_2N^-$), and the like.

Exemplary quaternizing agents include without limitation alkylating agents, such as for example butyl bromide, benzyl bromide, and neopentyl bromide. Various methylating agents may be suitably employed, such as for example and without limitation, alkyl halides, methyl iodide, methyl bromide, methyl chloride, and methyltosylate and the like.

It has been found that various amine derivatives vary in reactivity with respect to quaternization. For example, with respect to employing benzylbromide, the amines can have the following order of reactivity:

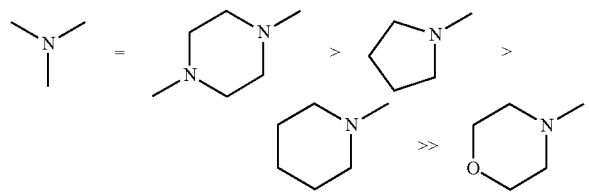

As this is illustrative, the use of other amines or other halides and agents can result in other orders of reactivity.

In general, the functionalized end block (i.e., D block) comprises on average at least one functionalized polymer unit of formula (I) or a corresponding onium salt. However, as the amount of functional groups which are present in the functionalized block copolymer has a direct impact on the anion exchange capacity of the material, equal to or greater than about 5% polymer units of the D block can be polymer units of formula (I) or the corresponding onium salt. In such examples, equal to or greater than about 10%, alternatively equal to or greater than about 15%, alternatively equal to or greater than about 20%, alternatively equal to or greater than about 25%, or alternatively equal to or alternatively greater than about 30% of the polymer units of the D block are polymer units of formula (I) or the corresponding onium salt.

In some aspects, 100% of the polymer units of the D block are polymer units of formula (I) or the onium salt. In other aspects, on average equal to or less than about 98%, alternatively equal to or less than about 95%, alternatively equal to or less than about 90%, or alternatively equal to or less than about 85%, of the polymer units of the D block are polymer units of formula (I) or the corresponding onium salt.

Accordingly, in some aspects, on average from about 10% to about 100%, alternatively from about 15% to about 100%, alternatively from about 20% to about 100%, alternatively from about 25% to about 100%, or alternatively from about 30% to about 100%, of the polymer units of the D block are polymer units of formula (I) or the corresponding onium salt. In further aspects, on average from about 10% to about 98%, alternatively from about 15% to about 98%, alternatively from about 20% to about 98%, alternatively from about 25% to about 98%, or alternatively from about 30% to about 98%, polymer units of the D block are polymer units of formula (I) or the corresponding onium salt. In some aspects, on average from about 10% to about 95%, alternatively from about 15% to about 95%, alternatively from about 20% to about 95%, alternatively from about 25% to about 95%, or alternatively from about 30% to about 95%, of the polymer units of the D block are polymer units of formula (I) or the corresponding onium salt. In other aspects, on average from about 10% to about 90%, alternatively from about 15% to about 90%, alternatively from about 20% to about 90%, alternatively from about 25% to about 90%, or alternatively from about 30% to about 90%, of the polymer units of the D block are polymer units of formula (I) or the corresponding onium salt. In yet further aspects, on average from about 10% to about 85%, alternatively from about 15% to about 85%, alternatively from about 20% to about 85%, alternatively from about 25% to about 85%, or alternatively from about 30% to about 85%, of the polymer units of the D block are polymer units of formula (I) or the corresponding onium salt.

When multiple D blocks are present in the functionalized block copolymer, the individual D blocks may be identical or different. Differences between multiple D blocks may reside in one or more of (i) the number average molecular weight, (ii) the number of functionalized block copolymer units of formula (I) and the corresponding onium salts, (iii) the presence or absence of co-polymerized monomers, (iv) where present, the amount and the nature of such co-polymerized monomers, or (v) combinations of (i) to (iv).

In some aspects, when the D blocks are derived from copolymers of the aforementioned (alkyl)styrenes, the (alkyl)styrene polymer units can constitute on average at least about 10% of the co-polymerized polymer block units. The (alkyl)styrene polymer units of such co-polymerized block(s) D can constitute on average equal to or greater than about 15%, alternatively equal to or greater than about 20%, alternatively equal to or greater than about 25%, or equal to or greater than about alternatively 30%, of the co-polymerized polymer block units. Moreover, the aforementioned (alkyl)styrenes of such co-polymerized block(s) D constitute on average equal to or less than about 80%, alternatively equal to or less than about 75%, or alternatively equal to or less than about 70%, of the co-polymerized polymer block units.

Accordingly, in some aspects in which a block D is derived from copolymers of the aforementioned (alkyl) styrenes the (alkyl)styrene polymer units can constitute on average from about 10% to about 80%, alternatively from about 15% to about 80%, alternatively from about 20% to about 80%, alternatively from about 25% to about 80%, or alternatively from about 30% to about 80%, of the co-polymerized polymer block units. In further aspects in which a block D is derived from copolymers of the aforementioned (alkyl)styrenes the (alkyl)styrene polymer units can constitute on average from about 10% to about 75%, alternatively from about 15% to about 75%, alternatively from about 20% to about 75%, alternatively from about 25% to about 75%, or alternatively from about 30% to about 75%, of the co-polymerized polymer block units. In other aspects in which a block D is derived from copolymers of the aforementioned (alkyl)styrenes the (alkyl)styrene polymer units can constitute on average from about 10% to about 70%, alternatively from about 15% to about 70%, alternatively from about 20% to about 70%, alternatively from about 25% to about 70%, or alternatively from about 30% to about 70%, of the co-polymerized polymer block units.

The A, D and optional B blocks of the functionalized block copolymers may be arranged in various configurations so long as at least one or all of the end blocks of such configurations are D blocks. The one or more A block(s) or B block(s) may be exterior or interior blocks. The functionalized block copolymers comprise, in addition to the end D blocks, at least one of a further block A or block B. In particular aspects, the functionalized block copolymers have a general configuration D-A, D-A-D, D-A-D-A-D, (D-A-D)$_n$ X, (D-A)$_n$X, D-B-A-B-D, D-A-B-A-D, (D-B-A)$_n$X, (D-A-B)$_n$X, D-B, D-B-D, D-B-D-B-D, (D-B-D)$_n$X, or (D-B)$_n$X, or mixtures thereof, wherein n is an integer from 2 to about 30, and X is a coupling agent residue, and wherein the plurality of A blocks, B blocks, or D blocks are the same or different. Further in cases where it is desirous to have a linear block copolymer, n is an integer of 2. However, in practice, when linear block copolymer is intended to be to linear, there will be some degree of branching, thus the n on average would be from 2-3. When non-linear, the block copolymer the integer n will be from 3 or more, and when star shaped, the integer n will be much greater than 3.

In an aspect, the functionalized block copolymers have a general configuration D-B, (D-B)$_n$X, D-B-D, (D-B-D)$_n$X or mixtures thereof, wherein n is an integer from 2 to about 30, and X is a coupling agent residue, and wherein the plurality of A blocks, B blocks, or D blocks are the same or different.

In an aspect, the functionalized block copolymers have a general configuration D-A, (D-A)$_n$X, D-A-D, (D-A-D)$_n$X or mixtures thereof, wherein n is an integer from 2 to about 30, and X is a coupling agent residue, and wherein the plurality of A blocks, B blocks, or D blocks are the same or different.

The functionalized block copolymer as disclosed herein can be prepared using any suitable methodology. Exemplary routes for preparation of the D block for the block copolymer include (1) preparation of a non-functionalized precursor block which is then halogenated, alternatively, (2) starting with a halogenated block copolymer which is then replaced with an amine or phosphine functionality, and alternatively, (3) a monomer route, where an amino- or phosphino-functionalized monomer is polymerized to form a block. The A blocks and/or B blocks can also be prepared sequentially before or after the D block according to the previously described configurations with optional coupling reactions.

The functionalized block copolymers can be prepared in various ways as schematically illustrated in the following scheme:

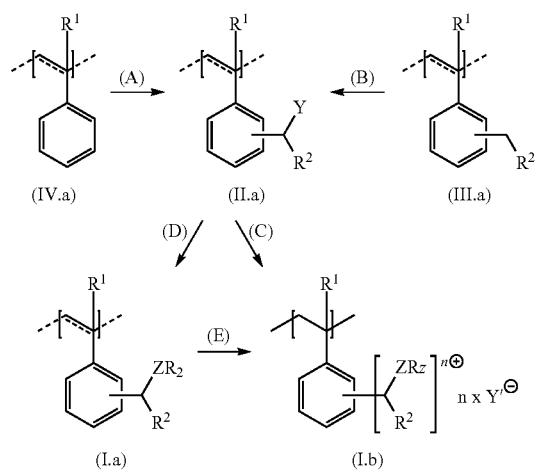

$R^1$, $R^2$, Z, R, Y'-, z, and n, in the foregoing formulae (II.a), (III.a), (IV.a), (I.a), and (I.b), have the meaning addressed in general and in particular in the foregoing. Y in formula (II.a) represents halogen, in particular chlorine or bromine. The sub-structure

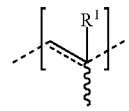

in formulae (II.a), (III.a), (IV.a), and (I.a), is intended to indicate that the starting material and product of the respective conversion may be a monomer or may be a polymer unit of a precursor block copolymer (formulae (III.a) and (IV.a)), of a halogenated block copolymer (formula (II.a)), or of a functionalized block copolymer (formulae (I.a)), respectively. Conveniently, the block copolymerization can be conducted prior to either one of the conversions (A), (B), or (E).

Those having ordinary skill will appreciate that the direct conversion from formula (II.a) to formula (I.b) along path (C) requires that formula (II.a) represent the unit of a halogenated block copolymer.

Contrastingly, the indirect conversion from formula (II.a) to formula (I.b) via formula (I.a) along path (D) and (E) may be conducted such that the starting material represented by formula (II.a) and the product represented by formula (I.a) are monomeric, the monomer (I.a) is subsequently block copolymerized to yield a functionalized block copolymer, also represented by formula (I.a), and the functionalized block copolymer represented by formula (I.a) is subsequently quaternized to yield the functionalized block copolymer represented by formula (I.b). The respective approach is schematically illustrated in the following scheme.

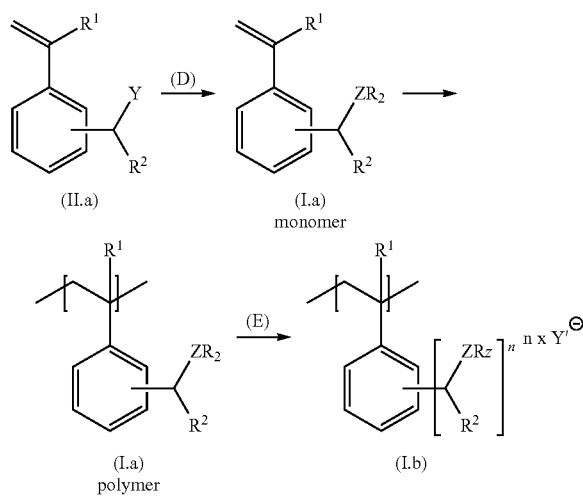

An exemplary illustration of the preparation of the amine functionalized monomer is shown as follows:

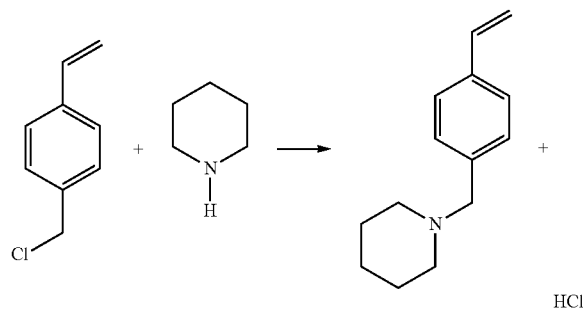

As shown above, p-vinylbenzyl chloride (p-VBC) can be reacted with an amine to form p-VBP with HCl as a byproduct. Although chloride is employed with p-VBC, it will be understood that other halides can be used as well. Further, other amines as described herein can be employed to form the functionalized monomer.

Alternatively, and as previously described, the halogenated monomer as represented by formula (II.a) can be used as starting material. Under those circumstances, the monomer is dissolved or dispersed in a solvent or solvent mixture for treatment with the amine of formula (V.b). Suitable solvents include the aforementioned protic or aprotic polar solvents as well as apolar solvents such as optionally halogenated hydrocarbons.

The polymerization of the functionalized block copolymers as, e.g., using monomers represented by formula (I.a), can be prepared by block copolymerization methods conventionally used for the block copolymerization of styrene block copolymers.

Conveniently, the respective block copolymers are block copolymerized via an anionic polymerization process in which the suitable monomers are polymerized in solution in the presence of a lithium initiator. The solvent used as the polymerization vehicle may be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacking in ionizable hydrogen atoms make particularly suitable solvents. Frequently used are cyclic alkanes, such as cyclopentane, cyclohexane, cycloheptane, and cyclooctane, all of which are relatively non-polar. Other suitable solvents can be selected to perform effectively in a given set of process conditions, with polymerization temperature being one of the factors taken into consideration.

Starting materials for preparing the respective block copolymers include the initial monomers, in particular those used to form the A block, B block or D block. However, in some aspects, the initial monomers to begin polymerization can be those used for the A block or D block. Other starting materials for anionic copolymerizations include one or more polymerization initiators. Suitable initiators include, for example, alkyl lithium compounds such as s-butyllithium, n-butyllithium, tert-butyllithium, amyllithium and the like and other organo lithium compounds including di-initiators such as the di-sec-butyllithium adduct of m-diisopropenyl benzene. Further suitable di-initiators are disclosed in U.S. Pat. No. 6,492,469. Of the various polymerization initiators, s-butyllithium may be utilized. The initiator can be used in the polymerization mixture (including monomers and solvent) in an amount calculated on the basis of one initiator molecule per desired polymer chain. The lithium initiator process is described in, for example, U.S. Pat. Nos. 4,039,593 and Re. 27,145.

Polymerization conditions to prepare the respective block copolymers are typically similar to those used for anionic polymerizations in general. In the present disclosure polymerization can be carried out at a temperature of from about −30° C. to about 150° C., alternatively at about 10° C. to about 100° C., or alternatively from about 30° C. to about 90° C. In some aspects the polymerization of the functionalized monomers and copolymerization with other monomers and blocks can be carried out at room temperature, alternatively from about 15° C. to about 70° C., alternatively from about 20° C. to about 60° C., or alternatively from about 25° C. to about 50° C., or combinations of these aforementioned temperatures, or individual temperatures within such ranges. The polymerization may be carried out in an inert atmosphere, such as nitrogen, and may also be accomplished under pressure within the range of from about 0.5 to about 10 bars. This copolymerization generally requires less than about 12 hours, and can be accomplished in from about 5 minutes to about 5 hours, depending upon the temperature, the concentration of the monomer components, and the desired molecular weight of the polymer or polymer block. When two or more of the monomers are used in combination, any copolymerization form selected from random, block, tapered block, controlled distribution block, and the like copolymerization forms may be utilized.

The functionalized block copolymers disclosed herein can be prepared by sequential polymerization. Using sequential polymerization alone can typically result in a linear polymer. However, a coupling step can also be employed. For example an initial block copolymer can be formed by sequential polymerization, and then a coupling agent added to form a final coupled block copolymer.

A variety of coupling agents can be used in preparing the coupled block copolymers of the present disclosure. These include, for example and without limitation, dihaloalkanes, silicon halides, siloxanes, multifunctional epoxides, silica compounds, esters of monohydric alcohols with carboxylic acids, (e.g. methylbenzoate and dimethyl adipate) and epoxidized oils. Star-shaped polymers are prepared with polyalkenyl coupling agents as disclosed in, for example, U.S. Pat. Nos. 3,985,830 4,391,949, and 4,444,953, and CA Patent No. 716,645. Suitable polyalkenyl coupling agents include without limitation divinylbenzene, and m-divinylbenzene. Particular examples include tetra-alkoxysilanes such as tetra-methoxysilane (TMOS) and tetra-ethoxysilane (TEOS), tri-alkoxysilanes such as methyltrimethoxysilane (MTMS), aliphatic diesters such as dimethyl adipate and diethyl adipate, and diglycidyl aromatic epoxy compounds such as diglycidyl ethers deriving from the reaction of bis-phenol A and epichlorohydrin. In an aspect, the coupling agent used can include a divinylaromatic compound such as divinyl benzene (DVB). DVB can be added at a ratio of DVB to initiator (such as a lithium initiator) of from about 0.5:1 to about 4:1, alternatively from about 1:1 to about 3:1, or alternatively, from about 2:1 to about 3:1. Surprisingly, employing DVB coupling agent with p-VBA derivative monomers, such as VBP, results in linear coupled block copolymers, having 2 arms. In other aspects, the coupled block copolymer can have 2 to 3 arms, or 3 arms, thus having an n of 2 to 3. In yet other aspects, the coupled block copolymer can have predominantly 2 arms, and therefore can be predominantly linear.

As noted, in some cases the block copolymer is selectively hydrogenated to remove any ethylenic unsaturation which could render A blocks and/or B susceptible to halogenation. Also, hydrogenation generally improves thermal stability, ultraviolet light stability, oxidative stability, and, therefore, weatherability of the final polymer.

Hydrogenation can be carried out via any of the several hydrogenation or selective hydrogenation processes. For example, such hydrogenation has been accomplished using methods such as those taught in, for example, U.S. Pat. Nos. 3,595,942, 3,634,549, 3,670,054, and 3,700,633, and US Re. 27,145. Accordingly, polymers containing ethylenic unsaturation may be hydrogenated using a suitable catalyst. Such catalyst, or catalyst precursor, can include a Group 9 or 10 metal such as nickel or cobalt which is combined with a suitable reducing agent such as an aluminum alkyl or hydride of a metal selected from Groups 1, 2 and 13 of the Periodic Table of the Elements, particularly lithium, magnesium or aluminum. The hydrogenation can be accomplished in a suitable solvent or diluent at a temperature from about 20° C. to about 120° C. Other catalysts that are useful include titanium based catalyst systems.

As mentioned, the amino- or phosphino-functionalized block copolymers as disclosed herein can include the amino or phosphino- functionalized block as a "tail." In particular, the amino- or phosphino-functionalized block can be a small portion relative the rest of the block copolymer.

For example, the amino- or phosphino-functionalized block, or blocks, taken together are equal to or less than about 15 wt %, alternatively equal to or less than about 10 wt % of the block copolymer, alternatively equal to or less than about 7.5 wt of the block copolymer, alternatively equal to or less than about 5 wt % of the block copolymer, alternatively equal to or less than about 3 wt % of the block copolymer, alternatively equal to or less than about 2 wt %, or alternatively equal to or less than about 1 wt % of the block copolymer, based on the total molecular weight of the block copolymer. Alternatively, the amino- or phosphino-functionalized block, or blocks, taken together are equal to or less than about 20 mol % of the block copolymer, alternatively equal to or less than about 15 wt %, alternatively equal to or less than about 10 wt % of the block copolymer, alternatively equal to or less than about 7.5 wt % of the block copolymer, alternatively equal to or less than about 5 wt % of the block copolymer, alternatively equal to or less than about 3 wt % of the block copolymer, alternatively equal to or less than about 2 wt %, or alternatively equal to or less than about 1 wt % of the block copolymer, based on the total molecular weight of the block copolymer.

In some instances, for example, where the block copolymer has large diene segments, or large B blocks, i.e, "soft" blocks, the amino- or phosphino-functionalized tail can be quaternized with a counter ion. Although not intending to be held to any particular theory, it is believed that in such cases, the quaternized ammonium or phosphonium functionalized blocks cross-link thereby providing mechanical strength the block copolymer. Therefore, although a large proportion of the polymer is made up of one or more soft B blocks, the ionic cross-linking due to the quaternized ammonium or phosphonium tail can enable formation of articles and membranes having acceptable tensile strengths. For example, the B block(s) can be as much as equal to or greater than about 50 wt % based on the total weight of the block copolymer, alternatively equal to or greater than about 70 wt %, alternatively equal to or greater than about 80 wt %, alternatively equal to or greater than about 90 wt %, alternatively equal to or greater than about 95wt %, or alternatively equal to or greater than about 99 wt %, by total molecular weight of the block copolymer. The B block(s) can be equal to or greater than about 50 mol %, alternatively equal to or greater than about 70 mol %, alternatively equal to or greater than about 80 mol % \, alternatively equal to or greater than about 90 mol %, alternatively equal to or greater than about 95 mol %, or alternatively equal to or greater than about 99 mol %. The amino- or phosphino-functionalized blocks can be quaternized and the block copolymer cast to a film or membrane having good mechanical properties, such as having strength and permitting some deformation when force is applied.

In an aspect, a block copolymer of the type disclosed herein is formed into a composition and cast into a film wherein the film is characterized by a permeability of from about $1.0E^{-8}$ $cm^2/s$ to about $1.0E^{-6}$ $cm^2/s$ and a permselectivity of less than about 80%, or alternatively less than about 75%.

In other aspects, the amino- or phosphino-functionalized block copolymer can be hydrogenated such that diene containing polymer segments are hydrogenated. For example, with the amino- or phosphino-functionalized block as a "tail" as described above, or in smaller amounts in the block copolymer, any diene blocks can be hydrogenated to levels of equal to or greater than about 50 mol %, alternatively equal to or greater than about 60 mol % or alternatively equal to or greater than about 70 mol % can be achieved.

Additional Closure

The following enumerated aspects of the present disclosures are provided as non-limiting examples.

Disclosed herein are block copolymers functionalized in at least one exterior block by amino- or phosphino- groups, or corresponding onium salt groups, and optionally additional hetero atoms, all of which contribute significant polarity to the block copolymer, and which can for example exhibit anion exchange properties or can be used for a variety of other applications. In particular the block copolymer employed can have an end amino- or phosphino-functionalized D block and one or more "hard" A block or "soft" B block, which may be interior or exterior blocks.

In a first aspect, the present disclosure pertains to a functionalized block copolymer comprising:

(a) at least one end block D comprising on average at least one amino- or phosphino-functionalized polymer unit of formula (I)

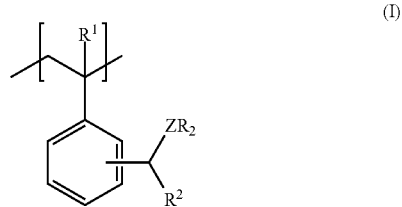

and
one or more additional blocks selected from the group consisting of:
(b) one or more A blocks substantially free of amino- or phosphino- functional groups and having a number average molecular weight of from about 1,000 to about 60,000, and has a high service temperature, and
(c) one or more B blocks, wherein each block B is essentially non-functionalized, has a number average molecular weight of from about 1,000 to about 1,000,000, and has a glass transition temperature of at most about 20° C., and
(d) mixtures of one or more A blocks and one or more B blocks;
wherein
Z is nitrogen or phosphorus;
$R^1$ is hydrogen or alkyl;
$R^2$ is hydrogen or is tertiary alkyl;
R each independently, is alkyl or phenyl optionally substituted by a moiety -($A^1$-$NR_a$)$_x$$R_b$ or -($A^1$-$OR_a$)x$R_b$; or
two R groups, together with the Z to which they are bonded, form an optionally substituted ring;
x is 1, 2 or 3;
$A^1$ is straight chain alkylene optionally substituted by one or more methyl and/or ethyl groups; and
$R_a$ and $R_b$, each independently, is hydrogen or alkyl; or a corresponding onium salt.

In a second aspect, the present disclosure pertains to the functionalized block copolymer in accordance with the first aspect, wherein the D block is formed on each of the external ends of the block copolymer.

In a third aspect, the present disclosure pertains to the functionalized block copolymer in accordance with either one of the foregoing aspects, wherein the at least one end block D is at least 25 wt % of the block copolymer.

In a fourth aspect, the present disclosure pertains to the functionalized block copolymer in accordance with any of the foregoing aspects one and two, wherein the at least one end block D is 50 wt % or less of the block copolymer.

In a fifth aspect, the present disclosure pertains to the functionalized block copolymer in accordance with any of the foregoing aspects one, two, and four, wherein the at least one end block D is 3 wt % or less of the block copolymer.

In a sixth aspect, the present disclosure pertains to the functionalized block copolymer in accordance with any of the foregoing aspects, wherein the functionalized block copolymer further comprises a B block having segments of conjugated dienes.

In a seventh aspect, the present disclosure pertains to the functionalized block copolymer in accordance with the sixth aspect, wherein at least 50% of the conjugated dienes units are hydrogenated.

In an eighth aspect, the present disclosure pertains to the functionalized block copolymer in accordance with anyone of aspects six of seven, wherein the D block comprises 15 wt % or less of the total molecular weight of the block copolymer.

In a ninth aspect, the present disclosure pertains to the functionalized block copolymer in accordance with anyone of aspects six of seven, wherein at least 70% of the conjugated dienes units are hydrogenated.

In a tenth aspect, the present disclosure pertains to the functionalized block copolymer in accordance with any of the foregoing aspects, wherein the functionalized block copolymer comprises at least one B block, wherein the at least one B blocks together are at least 50 wt % of the molecular weight of the block copolymer, and wherein 10 to 100% of the functional groups of the block(s) D are in the form of the onium salt.

In an eleventh aspect, the present disclosure pertains to the functionalized block copolymer in accordance with any of the foregoing aspects, wherein the functionalized block copolymer comprises at least one B block, wherein the at least one B blocks together are at least 75 wt % of the molecular weight of the block copolymer, and wherein the block copolymer is star-branched.

In a twelfth aspect, the present disclosure pertains to the functionalized block copolymer in accordance with any of the foregoing aspects, wherein the functionalized block copolymer comprises at least one B block, wherein each block B is essentially non-functionalized.

In a thirteenth aspect, the present disclosure pertains to the functionalized block copolymer in accordance with aspect eleven, wherein each block B is independently selected from the group consisting of polymerized (i) ethylene monomers, (ii) C3-C8 alpha-olefin monomers, (iii) isobutylene monomers, (iv) conjugated diene monomers, (v) (meth)acrylate ester monomers, (vi) a silicon polymer, and (vii) mixtures of monomers selected from (i) to (v), wherein segments containing polymerized conjugated diene monomers are optionally hydrogenated.

In a fourteenth aspect, the present disclosure pertains to the functionalized block copolymer in accordance with any of the foregoing aspects, having a general configuration A-B-D, D-B -D, B -D.

In a fifteenth aspect, the present disclosure pertains to the functionalized block copolymer in accordance with aspect fourteen, wherein the D block(s) taken together comprises less than 10 wt % of the total molecular weight of the block copolymer.

In a sixteenth aspect, the present disclosure pertains to the functionalized block copolymer in accordance with any of the foregoing aspects one through thirteen, having a general configuration D-A, D-A-D, D-A-D-A-D, (D-A-D)nX, (D-A)nX, D-B-A-B-D, D-A-B-A-D, (D-B-A)nX, (D-A-B)nX, D-B, D-B-D, D-B-D-B-D, (D-B-D)nX, or (D-B)nX, or mixtures thereof, wherein n is an integer from 2 to about 30, and X is a coupling agent residue, and wherein the plurality of A blocks, B blocks, or D A blocksre the same or different.

In a seventeenth aspect, the present disclosure pertains to the functionalized block copolymer in accordance with any of the foregoing aspects, wherein each block D is independently selected from the group consisting of (i) segments derived from homo- and copolymers of styrene, (ii) segments derived from homo- and copolymers of styrene having a phenyl ring which is substituted by a primary alkyl group, (iii) segments derived from homo- and copolymer of alpha-alkyl styrene, and (iv) segments derived from homo- and copolymers of alpha-alkyl styrene having a phenyl ring which is substituted by a primary alkyl group.

In an eighteenth aspect, the present disclosure pertains to the functionalized block copolymer in accordance with any of the foregoing aspects one through sixteen, wherein the D block is a mixed block comprising additional polymer units selected from one of (i) conjugated diene, or (ii) styrene or alpha-alkyl styrene monomers having a phenyl ring which is optionally substituted by one or more alkyl groups.

In a nineteenth aspect, the present disclosure pertains to a membrane or film comprising a functionalized block copolymer in accordance with any of the foregoing aspects.

In a twentieth aspect, the present disclosure pertains to a process for preparing an amino- or phosphino- functionalized block copolymer comprising in an inert hydrocarbon solvent and in the presence of an initiator, (a) polymerizing an end block D from a plurality of p-vinylbenzylamine monomers or vinylbenzylphosphine, the p-vinylbenzylamine or vinylbenzylphosphine monomers capable of being polymerized at a temperature range of from 20° C. to 60° C.; (b) polymerizing at least one or more additional blocks, wherein the one or more additional A blocksre selected from the group comprising an amorphous block B, the B block having a $T_g$ of at most 20° C., a crystalline or semi-crystalline block A, the block A having a high service temperature of at least about 20° C., and mixtures thereof; and (c) optionally coupling the block copolymer formed from steps (a)-(b), or polymerizing a second end block D.

copolymer in accordance with any of the foregoing aspects twenty through twenty-three, wherein the amino- functionalized block copolymer comprises at least one B block, wherein the at least one B blocks together are at least 50 wt % of the molecular weight of the block copolymer, and wherein 10 to 100% of the functional groups of the block(s) D are in the form of the onium salt.

In a twenty-fifth aspect, the present disclosure pertains to a membrane or film comprising a functionalized block copolymer in accordance with any of the foregoing aspects twenty through twenty-four.

EXAMPLES

Several exemplary amino-functionalized block copolymers are illustrated in Examples 1-8 of Table 1. The amino-functionalized block copolymers are prepared via a monomer route, namely, sequential polymerizing p-vinylbenzylamine (VBA) monomers before or after one or more other blocks of styrene (S), and/or conjugated dienes, such as isoprene (I) or butadiene (B). While VBA is generically indicated in the table (i.e. p-vinylbenzylamine), the particular VBA is indicated in the column "VBA type."

Initially, amino-functionalized block copolymers were commercially purchased or synthesized via nucleophilic substitution of a chloride substituent in poly-(p-vinylbenzylchloride) by a desired amino substituent. With the availability of the VBA monomers, sequential anionic polymerization can be conducted. In particular, anionic polymerization was carried out in cyclohexane as solvent at temperatures ranging from 25° C. to 70° C. However, with the employment of VBA monomer, polymerization was conducted at 25° C., (i.e. room temperature) using a lithium based initiator.

Prepared block copolymers of Examples 1-8 are shown in Table 1.

TABLE 1

| Ex. | Polymer structure | Configuration | VBA block length (kg/mol) | VBA type | Sty w % | BD w % | IP w % | VBA w % | $M_w$ (Kg/mol) | $M_n$ (Kg/mol) | D What is D and units please |
|---|---|---|---|---|---|---|---|---|---|---|---|
| 1 | S-B-VBA | A-B-D | 3 | VBPyr | 41 | 41 | | 18 | 29.2 | 21.6 | 1.35 |
| 2 | VBA-I-VBA | (D-B-D)n | <1 | VBP | | | 98 | 2 | 83.6 | 81.4 | 1.03 |
| 3 | VBA-I-VBA | D-B-D | <1 | VBP | | | 97.5 | 2.5 | 118.7 | 113 | 1.06 |
| 4 | S-B-VBA | A-B-D | <1 | VBP | 40 | 53 | | 7 | 31.2 | 30.3 | 1.03 |
| 5 | S-B-VBA | A-B-D | 1-3 | VBP | 40 | 50 | | 10 | 32.4 | 31.5 | 1.03 |
| 6 | I-VBA | B-D | 15-25 | VBPyr | | | 50 | 50 | 15 | 6.4 | 2.3 |
| 7 | I-VBA | B-D | 15-25 | VBP | | | 65 | 35 | 51.5 | 49.1 | 1.03 |
| 8 | VBA-I-VBA | D-B-D | 15-25 | VBP | | | 67 | 33 | 29.7 | 27.1 | 1.1 |

In a twenty-first aspect, the present disclosure pertains to the process for preparing an amino-functionalized block copolymer in accordance with aspect twenty, wherein the D block is formed on each of the external ends of the block copolymer.

In a twenty-second aspect, the present disclosure pertains to the process for preparing an amino- functionalized block copolymer in accordance with aspect twenty, wherein block D is polymerized from a plurality of p-vinylbenzylamine monomers.

In a twenty-third aspect, the present disclosure pertains to the process for preparing an amino- or phosphino- functionalized block copolymer in accordance with aspect twenty, wherein each end block D comprises 10 wt % or less of the total molecular weight of the block copolymer.

In a twenty-fourth aspect, the present disclosure pertains to the process for preparing an amino- functionalized block Example 2 was coupled using DVB, resulting in a 75% coupling efficiency, forming a star branched polymer and having a molecular weight of 614,000 g/mol-1,200,000 g/mol (Table 1 reports the molecular weight prior to coupling).

Mixed block copolymers of VBA with another monomer can be prepared as well. The synthesis procedure is similar to examples 1-8, however, for the copolymer block the mixture of monomers was initiated. Examples 9-11 are illustrated in Table 2, which include blocks having a mixed block of styrene and VBA, shown as S/VBA. In Tables 2-3, "/" indicates a random mixed block of two types of monomers. Example 9 was coupled with DVB, resulting in a 94% coupling efficiency, forming a star branched polymer and having predominantly a molecular weight of 320 kg/mol.

TABLE 2

| Ex. | Polymer structure | Configuration | VBA type | Sty w % | IP w % | VBA w % | Mw | Mn | D |
|---|---|---|---|---|---|---|---|---|---|
| 9 | [(S/VBA)-S-I]n | [D-A-B]n | VBP | 18 | 79 | 1[a] | 320 | — | — |
| 10 | S-I-S/VBA | A-B-D | VBP | 37 | 60 | 3 | 45.3 | 42.1 | 1.07 |
| 11 | S/VBA-I | D-B | VBP | 49 | 48 | 3 | 28 | 27 | 1.03 |

[a] The coupling agent, divinylbenzene, content was 2 w %.

Phosphino-functionalized block copolymers are illustrated in Examples 12-13 of Table 3. The phosphino-functionalized block copolymers are prepared via the same synthesis method as examples 9-11 but at a polymerization temperature of 40° C. While VBPh is generically indicated in the table (i.e. p-vinylbenzylphosphine), the particular VBPh is indicated in the column "VBPh type."

TABLE 3

| Ex. | Polymer structure | Configuration | VBPh type | Sty w % | IP w % | VBPh % | $M_w$ | $M_n$ | D |
|---|---|---|---|---|---|---|---|---|---|
| 12 | (VBPh/S)-I | D-B | VBMDPP | 18 | 75 | 7 | 142.6 | 110.5 | 1.2 |
| 13 | (VBPh/S)-I | D-B | VBMBPT | 20 | 74 | 6 | 69.2 | 67.1 | 1.2 |

Hydrogenated amino-functionalized block copolymers can also be formed. For example, in one experiment, a polymer solution of Example 2 was prepared by dissolving the polymer in cyclohexane to form a polymer solution having approximately 5 wt % solids content. The polymer was then hydrogenated by introducing hydrogen gas at 40 barg and a temperature of 75° C., in the presence of approximately 100 ppm of a cobalt/aluminum catalyst. The resulting polymer solution was washed twice with a 1% phosphoric acid solution in water at 75° C. After neutralization with aqueous ammonia and an addition of 0.2 parts per hundred resin ("phr") of Irganox® 1010, the hydrogenated polymer was coagulated by steam coagulation and subsequently dried under vacuum at 60° C. The residual polydiene unsaturation level was determined by 1H-NMR to be 0.03 milliequivalents/g of polymer.

Further Hypothetical Examples with mixed blocks, which can be prepared according to the procedure in Tables 1 and 2, are shown in Table 4 as follows:

TABLE 4

| Example | Polymer structure | Configuration | VBA (%) | VBA block (molecular weight) |
|---|---|---|---|---|
| 14 | S-(I/VBA) | A-D | 2 | random block |
| 15 | S-EP-VBA Mol. Wt: 35-65-3 | A-B-D | 3 | — |
| 16 | [S/VBA-PS-PI]n | [D-A-B]n | 1 | random block |
| 17 | S-I-S/VBA | A-B-D | 1 to 3 | random block |

Further examples were prepared with and without quaternization, as shown in Table 5.

TABLE 5

| Example | Polymer structure | VBP wt % | VBA block (molecular weight) | Branching | Quaternizing agent | IEC(POLYUSAT #s?) Meq/g |
|---|---|---|---|---|---|---|
| 8 | [(VBP)-I]n | 33.2 | 15-25 | 2-3 | N/A | 1.65 |
| 8A | [(VBP)-I]n | 33.2 | 15-25 | 2-3 | BzBr | 1.65 |
| 2 | [(VBP)-I]n | 2 | <1 | Star branched | N/A | 0.1 |

TABLE 5-continued

| Example | Polymer structure | VBP wt % | VBA block (molecular weight) | Branching | Quaternizing agent | IEC(POLYUSAT #s?) Meq/g |
|---|---|---|---|---|---|---|
| 2A | [(VBP)-I]n | 2 | <1 | Star branched | MeI | 0.1 |

Any of the examples in Tables 1-3 can be subsequently quarternized in order to convert the p-VBA moieties into quaternary poly-ammonium salts by reaction with stoichiometric quantities of a suitable quarternizing agent. Examples 2 and 8 from Table I were successfully quaternized in chloroform by reaction with methyliodide or benzylbromide (cf. Table 5). Before quarternization, the products represented sticky, semi-solid materials. After quaternization both products could be cast into elastic flexible films. IEC in Table 5 represents the ion equivalent content of each polymer based on the presence of the amino functionality.

Example 8A was subsequently formed into a film by solution casting onto Mylar with a 120 micrometer film applicator. The resulting film was then tested for ion transport properties including permeability and permselectivity. The film of Ex. 8A exhibited a permeability of $1.0E^{-7}$ cm$^2$/s and a permselectivity of 70%.

Further properties of the compositions of the present disclosure are presented in Tables 6 and 7.

The foregoing descriptions of specific compositions and methods of the present disclosure have been presented for purposes of illustration and description. They are not intended to be exhaustive or to limit the disclosure to the precise compositions and methods disclosed and obviously many modifications and variations are possible in light of the above teaching. The examples were chosen and described in order to best explain the principles of the disclosure and its practical application, to thereby enable others skilled in the art to best utilize the disclosure with various modifications as are suited to the particular use contemplated. It is intended that the scope of the disclosure be defined by the claims appended hereto and their equivalents.

What is claimed is:

1. A functionalized block copolymer comprising:
   (a) at least one end block D comprising on average at least one amino-functionalized polymer unit of formula (I)

TABLE 6

| Sample No. | Product | NMR weight Percentages % | | | IEC (meq/g) | BenzylBr | MeI |
|---|---|---|---|---|---|---|---|
| | | VBAm | IP | Sty | | | |
| 18 | (Sty-IP-VBP)n | 35 | 23 | 42 | 1.74 | x | |
| 19 | (Sty-IP-VBP)n | 39.8 | 27.6 | 32.6 | 1.98 | x | x |
| 20 | (Sty-IP-VBP)n | 28.6 | 44.7 | 26.7 | 1.42 | x | x |
| 21 | (Sty-IP-VBP)n | 32.5 | 33.8 | 32.7 | 1.61 | x | x |
| 22 | (Sty-IP-VBP)n | 39.3 | 43 | 17.7 | 1.95 | x | x |
| 23 | (Sty-IP-VBP)n | 33.4 | 43.5 | 23.1 | 1.66 | | x |
| 24 | (Sty-IP-VBP)n | 36.7 | 39.1 | 24 | 1.82 | | x |
| 25 | (Sty-IP-VBPyr)n | 23.5 | 31.5 | 45 | 1.25 | x | x |
| 26 | (Sty-IP-VBPyr)n | 26.9 | 43.5 | 29.6 | 1.44 | x | x |
| 27 | (Sty-IP-VBPyr)n | 31.2 | 40.3 | 28.5 | 1.67 | x | x |
| 28 | (Sty-IP-VBPyr)n | 48.5 | 36.5 | 15 | 2.59 | x | x |
| 29 | (Sty-IP-VBMPip)n | 37.4 | 31.5 | 31.1 | 1.73 | | x |
| 30 | (Sty-IP-VBMPip)n | 29.1 | 40.5 | 30.4 | 1.35 | | x |
| 31 | (VBP-I)n | 33.2 | 66.8 | | 1.65 | x | |
| 32 | (VBP-I)n | 2 | 98 | | 0.1 | | x |

TABLE 7

| Sample # | Ion Transport | | Dry Tensile | | Wet Tensile | | Water Uptake | | Water Transport | |
|---|---|---|---|---|---|---|---|---|---|---|
| | Permeability (cm$^2$/sec) | Permselectivity (%) | Strength (psi) | Elongation (%) | Strength (psi) | Elongation (%) | By area (%) | By Weight (%) | MVTR | WVTR |
| 33 | 8.50E−08 | 80 | 1800 | 10 | 750 | 100 | 25 | 50 | 900 | 24000 |
| 34 | 2.60E−09 | 95 | 3100 | 40 | 1800 | 230 | 0 | 30 | 390 | 960 |
| 20 | 0 | 80 | 1500 | 540 | 2000 | 890 | 0 | 10 | 160 | 170 |
| 19 | 4.30E−08 | 80 | 1000 | 0 | 1000 | 470 | 5 | 0 | 390 | 13000 |
| 26 | 1.40E−08 | 90 | 2300 | 380 | 1500 | 850 | 0 | 0 | | |
| 27 | 1.30E−08 | 90 | 1900 | 480 | 2100 | 950 | 0 | 0 | | |
| 35 | 7.80E−10 | 95 | 1800 | 0 | 1550 | 500 | 0 | 0 | | |
| 31 | m | 70 | | | | | | | | |
| 21 | 6.30E−09 | 95 | | | | | | | | |
| 37 | 7.60E−07 | 75 | 2100 | 130 | | | | | | |

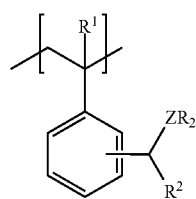

and
one or more additional blocks selected from the group consisting of:
(b) one or more A blocks substantially free of amino-functional groups and having a number average molecular weight of from about 1,000 to about 60,000, and has a high service temperature of at least about 20° C., and
(c) one or more B blocks, wherein each block B is essentially non-functionalized, has a number average molecular weight of from about 1,000 to about 1,000,000, and has a glass transition temperature of at most about 20° C.,
and
(d) mixtures of one or more A blocks and one or more B blocks;
wherein
Z is nitrogen;
$R^1$ is hydrogen or alkyl;
$R^2$ is hydrogen or tertiary alkyl;
the two R groups, together with the Z to which they are bonded, form an optionally substituted ring;
or a corresponding onium salt.

2. The functionalized block copolymer of claim 1, wherein the D block is formed on each of the external ends of the block copolymer.

3. The functionalized block copolymer of claim 1, wherein the at least one end block D is at least 25 wt % of the block copolymer.

4. The functionalized block copolymer of claim 1, wherein the at least one end block D is 15 wt % or less of the total molecular weight of the block copolymer.

5. The functionalized block copolymer of claim 1, wherein the at least one end block D is 3 wt % or the less of total molecular weight of the block copolymer.

6. The functionalized block copolymer of claim 1, wherein the B block comprises segments of conjugated dienes.

7. The functionalized block copolymer of claim 6, wherein at least 50% of the conjugated dienes units are hydrogenated.

8. The functionalized block copolymer of claim 7, wherein the D block comprises 15 wt % or less of the total molecular weight of the block copolymer.

9. The functionalized block copolymer of claim 6, wherein at least 70% of the conjugated dienes units are hydrogenated.

10. The functionalized block copolymer of claim 1, comprising at least one B block, wherein the at least one B blocks together are at least 50 wt % of the molecular weight of the block copolymer, and wherein 10 to 100% of the functional groups of the block(s) D are in the form of the onium salt.

11. A membrane or film comprising the functionalized block copolymer of claim 10.

12. The functionalized block copolymer of claim 1 comprising at least one B block, wherein the at least one B blocks together are at least 75 wt % of the molecular weight of the block copolymer, and wherein the block copolymer is star-branched.

13. The functionalized block copolymer of claim 1 comprising at least one block B, wherein each block B is essentially non-functionalized.

14. The functionalized block copolymer according to claim 12, wherein each block B is independently selected from the group consisting of polymerized (i) ethylene monomers, (ii) $C_3$-$C_8$ alpha-olefin monomers, (iii) isobutylene monomers, (iv) conjugated diene monomers, (v) (meth) acrylate ester monomers, (vi) a silicon polymer, and (vii) mixtures of monomers selected from (i) to (v), wherein segments containing polymerized conjugated diene monomers are optionally hydrogenated.

15. The functionalized block copolymer according to claim 1, having a general configuration of A-B-D, D-B-D, or B-D.

16. The functionalized block copolymer according to claim 15, wherein the D block(s) taken together comprises less than 15 wt % of the total molecular weight of the block copolymer.

17. The functionalized block copolymer according to claim 1, having a general configuration D-A, D-A-D, D-A-D-A-D, (D-A-D)$_n$X, (D-A)$_n$X, D-B-A-B-D, D-A-B-A-D, (D-B-A)$_n$X, (D-A-B)$_n$X, D-B, D-B-D, D-B-D-B-D, (D-B-D)$_n$X, or (D-B)$_n$X, or mixtures thereof, wherein n is an integer from 2 to about 30, and X is a coupling agent residue, and wherein the plurality of A blocks, B blocks, or D blocks are the same or different.

18. The functionalized block copolymer according to claim 1, wherein each block D is independently selected from the group consisting of (i) segments derived from homo- and copolymers of styrene, (ii) segments derived from homo- and copolymers of styrene having a phenyl ring which is substituted by a primary alkyl group, (iii) segments derived from homo- and copolymer of alpha-alkyl styrene, (iv) segments derived from homo- and copolymers of alpha-alkyl styrene having a phenyl ring which is substituted by a primary alkyl group, and (v) combinations of (i) to (iv).

19. The functionalized block copolymer according to claim 1, wherein the D block is a mixed block comprising additional polymer units selected from one of (i) conjugated diene, or (ii) styrene or alpha-alkyl styrene monomers having a phenyl ring which is optionally substituted by one or more alkyl groups.

20. A process for preparing an amino-functionalized block copolymer comprising:
in an inert hydrocarbon solvent and in the presence of an initiator,
(a) polymerizing an end block D from a plurality of p-vinylbenzylamine monomers, the p-vinylbenzylamine monomers capable of being polymerized at a temperature range of from 20° C. to 60° C.;
(b) polymerizing at least one or more additional blocks, wherein the one or more additional blocks are selected from the group comprising:
an amorphous block B, the B block having a $T_g$ of at most 20° C., wherein the block B is essentially non-functionalized, and has a number average molecular weight of from about 1,000 to about 1,000,000,
a crystalline or semi-crystalline block A, the block A having a high service temperature of at least about 20° C., wherein the block A is substantially free of amino- functional groups, and has a number average molecular weight of from about 1,000 to about 60,000, and mixtures thereof; and (c) optionally coupling the block copolymer formed from steps (a)-(b), or polymerizing a second end block D;

wherein:

the end block D comprises on average at least one amino functionalized polymer unit of formula (I)

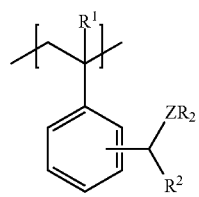
(I)

wherein
Z is nitrogen;
$R^1$ is hydrogen or alkyl;
$R^2$ is hydrogen or tertiary alkyl;
the two R groups, together with the Z to which they are bonded, form an optionally substituted ring;
or a corresponding onium salt.

21. The process of claim 20, wherein the D block is formed on each of the external ends of the block copolymer.

22. The process of claim 20, wherein block D is polymerized from a plurality of p-vinylbenzylamine monomers.

23. The process of claim 22, wherein each end block D comprises 10 wt % or less of the total molecular weight of the block copolymer.

24. The process of claim 22, wherein the functionalized block copolymer comprises at least one B block, wherein the at least one B blocks together are at least 50 wt % of the molecular weight of the block copolymer, and wherein 10 to 100% of the functional groups of the block(s) D are in the form of the onium salt.

25. The process of claim 22, further comprising casting the functionalized block copolymer into a membrane or film.

* * * * *